July 8, 1969   T. G. WILLIAMS   3,453,752
ANSWER COMPARISON DEVICE
Filed Jan. 27, 1967

INVENTOR.
THOMAS G. WILLIAMS
BY Ronald Zibelli
ATTORNEYS 3,453,752
ANSWER COMPARISON DEVICE
Thomas G. Williams, Rochester, N.Y., assignor to Xerox Corporation, Rochester, N.Y., a corporation of New York
Filed Jan. 27, 1967, Ser. No. 612,117
Int. Cl. G09b 17/00
U.S. Cl. 35—39                    7 Claims

ABSTRACT OF THE DISCLOSURE

An answer comparison device is set forth which compares an answer visually found by the operator on the scale of a measuring instrument to the actual value of the reading on the instrument. The operator's reading is converted to an electrical signal by punching it into a keyboard converter and is compared by an electrical subtractor to an electrical signal automatically generated by the measuring instrument itself.

BACKGROUND OF THE INVENTION

This application relates, in general to an answer comparison device, and, more specifically, to a device which electrically compares a measurement independently found by the operator on a measuring device to the actual value of the quantity being measured.

This device can be used in combination with many different types of measuring devices such as micrometers, slide rules, meters, indicators, rulers, etc. The answer comparison device can function a self-teaching apparatus which helps the operator become proficient in the use of measuring devices of the type mentioned above. The device is self-teaching because the operator can, with a minimum amount of instruction, determine the value of the measurement by visually reading the scale of the measuring device with which he is working, feed his reading into a keyboard, and immediately be told by the device whether or not his reading is correct, and if incorrect, whether the correct answer is a higher or lower value.

Another function of the answer comparison device is verification. Under many circumstances; for instance, on an assembly line, many readings are taken in relatively rapid succession by an operator who is familiar with the use of the measuring device. In spite of his proficiency the operator may still make an erroneous reading through a visual error. To make the operator aware of the error in his reading, especially in the context of quality control, he can periodically refer his reading to this device for verification to be certain that it is accurate.

The answer comparison device is flexible because it can work with or without a program depending on the nature of the function it is to serve. Moreover, the scales of the measuring devices can be changed periodically to allow readings in alternative units of measurement without any corresponding adjustment in the answer comparison device necessary. A second advantage is that it is adaptable to a great number of electrical and mechanical measuring devices. Additional advantages lie in the fact that the comparison device can be driven with very little energy, even by batteries, and that the device can be manufactured and fabricated economically because of its simplicity. Accordingly it is an object of this invention to provide an improved device for comparing answers.

It is a further object to provide an improved device for teaching a student to use various measuring devices.

A still further object is to provide an improved answer comparison device which verifies answers found on a measuring device by the operator.

It is a further object to provide an improved device for comparing answers with or without the use of a program.

SUMMARY

The answer comparison device is used in combination with various electrical or mechanical measuring devices; for example, one embodiment is the device in combination with an ordinary micrometer. When the measuring device is a micrometer the operator measures an object in the conventional manner by adjusting the barrel of the micrometer until the object being measured just fits between the anvil and spindle. A voltage divider attached to the micrometer barrel sends an electrical signal to the answer comparison device, the value of which varies according to the position of the microscope barrel relative to the micrometer frame. The operator reads the scale on the micrometer barrel and manually punches his reading into a keyboard converter which is electrically connected to the answer comparison device. The keyboard converter converts the operator's answer into an electrical signal which varies according to the combination of keys punched.

The two signals, the signal derived directly from the micrometer itself and the signal derived from the keyboard converter, are simultaneously fed into a differential amplifier, or subtractor, where they are compared. If the two signals are unequal, when the operator closes a first switch a wrong answer indicator will light showing that the answer was incorrect and when the operator closes a second switch a high-low indicator will show that the operator's answer is either higher or lower than the correct value. If, on the other hand, the two signals are equal, when the first switch is closed, the wrong answer indicator will fail to light thereby indicating the answer to be correct and when the second switch is closed the high-low indicator will remain at or approximately at center zero. When an incorrect answer is found, the operator again measures the object and punches his new reading into the keyboard converter in an effort to arrive at the correct value.

BRIEF DESCRIPTION OF THE DRAWINGS

The foregoing and other objects, features and advantages of the present invention will become apparent from the following description when taken in conjunction with the accompanying drawings which illustrate one embodiment of the invention and in which.

DESCRIPTION OF THE PREFERRED EMBODIMENT

Figure 1:
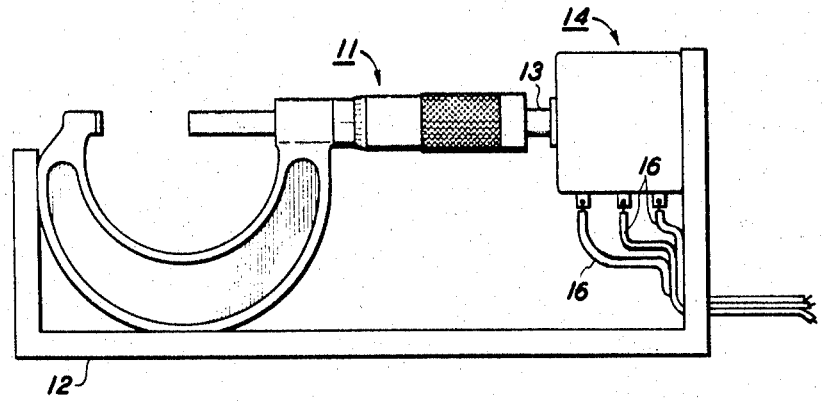
FIGURE 1 is a side view of an apparatus which can be used to generate an electrical signal conforming to the micrometer reading.

FIGURE 1 shows a micrometer 11 with a potentiometer 14 mounted at the end of its barrel and connected to the barrel through rotor 13. The potentiometer housing remains in a fixed position relative to the anvil of the micrometer by virtue of frame 12 which is located so that it does not interfere with the proper operation of the micrometer. When a measurement is taken the location of the micrometer barrel determines the position of the potentiometer rotor relative to the rest of the potentiometer thereby defining the nature of the electrical signals sent back to the answer comparison device through the electrical leads. Potentiometer 14 has three electrical leads 16 which connect it to the answer comparison device; one lead links the potentiometer to the power source, a second to the ground, and a third to the subtractor.

Figure 2:
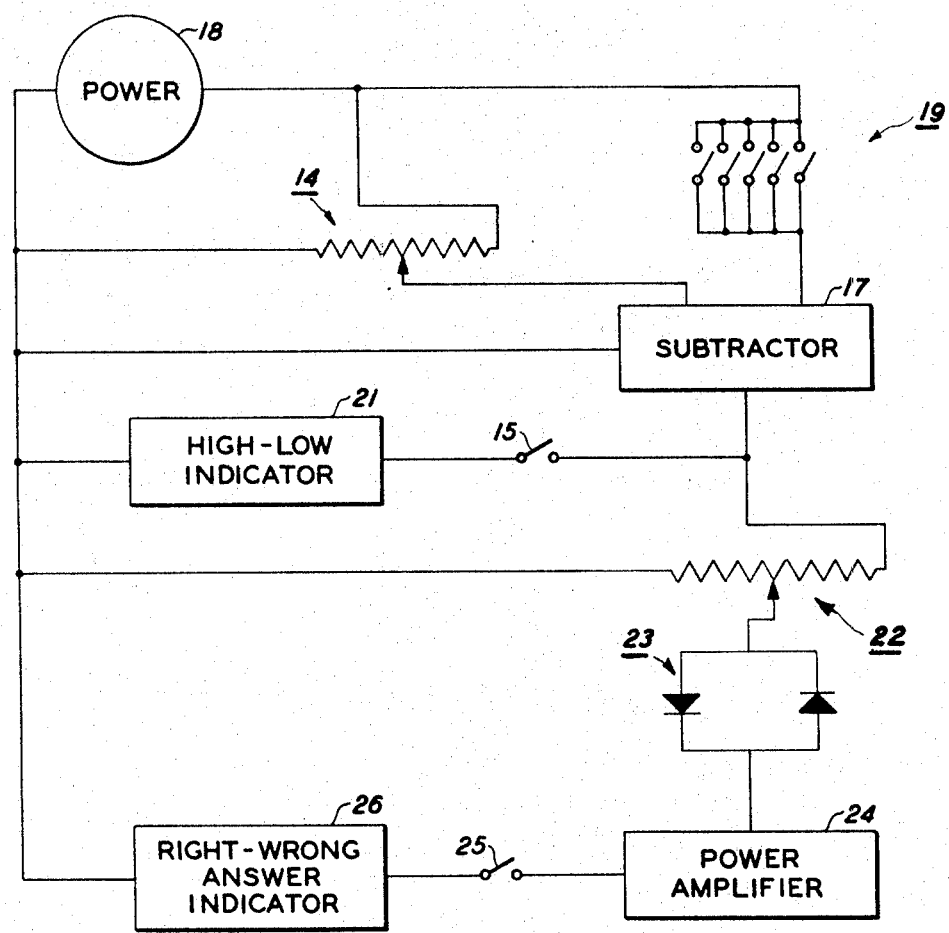
FIGURE 2 is a schematic diagram of an apparatus which can be used to compare the signal generated by the measuring device to the signal punched into the comparison device by the operator.

FIGURE 2 represents a schematic diagram of the various elements in the answer comparison device. Power source 18 directly feeds keyboard converter 19 and module potentiometer 14. In the present embodiment of the device a keyboard converter is used to supply the input from the operator because an array of keys set out in a logical decimal matrix is one of the more familiar address systems to students. However, several other types of address systems could easily be adapted to this device such as switches, dials or buttons. The module potentiometer 14 is preferably a ten-turn potentiometer which supplies the device with a standard signal with which the signal representing the operator's answer can be compared. The signal generated by the keyboard converter and the signal generated by the module potentiometer are fed simultaneously into subtractor 17 where the two signals are electrically compared.

When the operator punches in the correct answer on this keyboard, the two signals received by the subtractor will be regarded as being equal by the device if the signal from the converter is equal to the signal generated by the module potentiometer is within a given tolerance. This tolerance, which can be varied by the tolerance potentiometer 22 according to the degree of accuracy desired, allows the operator to be told by the device that his answer is correct even though he might not have punched the precise answer into the keyboard. The tolerance potentiometer is particularly valuable when the device is being used to teach the operator how to use a measuring device and the precise answer is not essential. In this case, when the two signals received by the subtractor are subtantially equal the electrical potential across high-low indicator 21 is substantially zero when switch 15 is closed by the operator. This absence of potential across the indicator causes the needle of the indicator to point to a scale reading of zero. Because there is no electrical potential across the high-low indicator when the correct answer is punched into the keyboard converter, current does not flow through threshold gate 23, power amplifier 24 or wrong answer indicator 26 when switch 25 is closed.

When the signals received by the subtractor are unequal, an electrical potential exists across high-low indicator 21 upon closing switch 15. If an answer lower than the correct answer is punched into the keyboard, the electrical current flows across indicator 21 in one direction moving the needle to the low side of the scale whereas if an answer higher than the correct answer is punched into the keyboard, the electrical current flows across indicator 21 in the opposite direction moving the needle to the high side of the scale. In both cases the degree of error in the answer found by the operator is proportionally represented by the amount of deviation made by the needle from the center zero position.

When the operator punches an incorrect answer into the keyboard, whether higher or lower in value than the correct answer, wrong answer indicator 26 will be activated when switch 25 is closed. Threshold gate 23 consists of an electrical circuit with two diodes which act as "gates" to the current coming to the circuit from either direction. Depending on whether the voltage output of the subtractor is higher or lower than the voltage in the main line from power source 15, which ultimately depends on whether the answer is punched into the keyboard is higher or lower than the signal from the measuring device, current can flow through threshold gate 23 in either direction. Thus, it is necessary to have two diodes in the threshold gate, each accommodating current in a different direction. Each diode permits current to pass on through the circuit only after the electrical potential across it reaches certain value. This certain value is, in essence, the basic margin of error allowed in the answer punched into the keyboard by the operator. When the basic margin of error is exceeded, current flows through the diode activating the wrong answer indicator.

Potentiometer 22 is placed in the apparatus so that the degree of error tolerated before the wrong answer indicator is activated can be regulated manually. This is accomplished by dividing the voltage at the output of the subtractor so that only a portion of it is received by the threshold gate. By using potentiometer 22 in this manner, indicator 26 is most precise when the voltage at the threshold gate is the same as that at the output of the subtractor. As the pick-off on the voltage divider is utilized, the threshold gate receives progressively smaller percentages of the voltage that exists at the output of the subtractor, and, consequently, the sensitivity of indicator 26 decreases. By adjusting the potentiometer, the margin of error tolerated by the device can be narrowed to require a more precise answer by the operator; for instance, when using the device for verification, or the margin of area tolerated can be broadened to allow any answer within a wide range to satisfy as a correct answer; for instance, when using the device as a teaching aid.

Power amplifier 24 is placed in the circuit only as an optional feature and can be used to adjust the energy levels between indicator 26 and threshold gate 23. The amplifier would be especially desirable if, in an effort to keep the cost of manufacture low, the elements used in the circuit consist of standard catalogue items having fixed characteristics. If such catalogue elements are used, the nature of the energy which makes the threshold gate operable would be of a different order compared to the energy which makes the right-wrong indicator operable. In such a case, it is desirable to place an amplifier between the gate and indicator.

The foregoing description relates to the answer comparison device when used in combination with a micrometer. There are many other types of measuring instruments which can be used in conjunction with the present device. Slide rules, meters, rulers, and most other measuring instruments having a scale and indicator can be used with the device with very little modification.

If the measuring device were an electrical meter rather than a micrometer, the circuit required for the answer comparison device would be the same as in FIGURE 2 with the exception that potentiometer 14 is deleted and the electrical lead from the meter would be connected directly to subtractor 17. With this minor change the operator uses the answer comparison device in exactly the same manner as he used it when the micrometer was the measuring instrument. The operator reads the scale of the meter and punches his reading into the keyboard. The signal imparted on the meter by external means; i.e., the signal being measured by the meter, is, in this case, also the signal fed into the subtractor to be compared to the signal generated by the keyboard converter.

Alternatively, if the measuring device were a ruler, the circuit is again in FIGURE 2 used with slight modification. In this type of measuring device a potentiometer should be adapted to the configuration of the ruler. One embodiment of such a potentiometer is a caliber-like arrangement which is adjustable by the operator wherein one arm of the caliber is a fixed anvil aligned with the zero reading on the ruler scale while the other arm is capable of being moved across the entire length of the ruler scale. The movable arm acts as the pick-off of the voltage divider. This pick-off maintains continuous contact with a resistor which is fixed to the ruler and which extends the entire length of the ruler scale. When the operator reads the scale of the ruler he must also adjust the movable caliber arm keeping the object being measured between it and the anvil. This can be assured by making the movable arm the indicator on the scale from which the operator determines the value of his reading. The operator punches his reading into the keyboard and the signal generated by the keyboard converter is electrically compared to the signal generated by the potentiometer, the potentiometer signal being dependent on the position of the movable caliber arm with reference to the ruler scale.

As indicated previously, a great variety of measuring devices can be used with the answer comparison device. In all cases, the only element of the circuit that may differ from device to device is the apparatus which generates the signal of the true reading; e.g., potentiometer 14 in FIGURE 2. Otherwise, each other element of the circuit shown in FIGURE 2 remains unchanged regardless of the type of measuring device used.

In addition to the apparatus outlined above many other modifications and/or additions to this invention will be readily apparent to those skilled in the art upon reading this disclosure, and these are intended to be encompassed within the spirit of the invention.

What is claimed is:

1. An apparatus for verifying readings found by an operator on a measuring device comprising:
   (a) a measuring scale;
   (b) a scale indicator;
   (c) a first electrical signal generator coupled to said measuring device so as to generate an electrical signal proportional to the position of said scale indicator with respect to said scale;
   (d) a reading register to record the operator's reading from said measuring device and generate a second electrical signal proportional to said reading;
   (e) an electrical subtractor with its two inputs connected to the outputs of said first and second signal generators; and
   (f) an electrically actuated indicator connected to the output of said subtractor so that a difference between the output of said first and second electrical signal generators will actuate said indicator.

2. The apparatus according to claim 1 wherein said measuring device is a micrometer having an anvil and an adjustable spindle, and said first electrical signal generator comprises a multi-turn electrical voltage divider having its voltage tap connected to said spindle; and, further including, a voltage source connected in series with said voltage divider whereby said voltage divider generates an electrical signal proportional to the distance between said spindle and said anvil.

3. The apparatus according to claim 1 wherein said reading register comprises a keyboard converter having a matrix of keys, each of said keys being connected to generate an output voltage proportional to the value on its face whereby the operator's reading is converted into said second electrical signal.

4. The apparatus according to claim 1 wherein said electrically actuated indicator comprises:
   (a) a bi-directional threshold gate;
   (b) means to indicate the flow of current through said gate; and
   (c) a power amplifier; all being in series, and the combination being connected across the output of said subtractor.

5. The apparatus according to claim 4 wherein said bi-directional threshold gate comprises two diodes connected in parallel, one passing current in the opposite direction of the other.

6. The apparatus according to claim 4 further including a voltage divider connected across the output of said subtractor with its output tap in series with said bi-directional threshold gate, said amplifier, and said means to indicate flow of current through said threshold gate, whereby the operator can adjust the sensitivity of said electrically activated indicator by adjusting said voltage divider.

7. The apparatus according to claim 1 further including a bi-directionally operable indicator connected directly to the output of said subtractor whereby the operator can determine whether said second signal is of a higher or lower value than said first signal.

References Cited

UNITED STATES PATENTS

| | | | |
|---|---|---|---|
| 2,153,231 | 4/1939 | Barnard | 35—6 |
| 3,081,379 | 3/1963 | Lemelson. | |
| 3,226,833 | 1/1966 | Lemelson | 33—166 |
| 3,095,653 | 7/1963 | Corrigan | 35—9 |
| 3,190,009 | 6/1965 | Zagar | 33—125 X |

OTHER REFERENCES

IBM Technical Disclosure Bulletin, "Digital Micrometer," D. A. Bourne, vol. 3, No. 11, April 1961.

WILLIAM D. MARTIN, JR., *Primary Examiner.*

U.S. Cl. X.R.

33—166; 35—9